United States Patent [19]

Schwetz et al.

[11] 4,107,276

[45] Aug. 15, 1978

[54] MANUFACTURE OF HEXAGONAL BORON NITRIDE

[75] Inventors: Karl Alex Schwetz, Sulzberg; George Vogt, Kempten-Sankt Mang; Alfred Lipp, Bad Worishofen, all of Fed. Rep. of Germany

[73] Assignee: Elektroschmelzwerk Kempten GmbH, Herzog-Wilheim-Strasse 16, Fed. Rep. of Germany

[21] Appl. No.: 808,212

[22] Filed: Jun. 20, 1977

Related U.S. Application Data

[63] Continuation-in-part of Ser. No. 644,399, Dec. 29, 1975, abandoned.

[30] Foreign Application Priority Data

Dec. 30, 1974 [DE] Fed. Rep. of Germany ....... 2461821

[51] Int. Cl.$^2$ ............................................. C01B 35/08
[52] U.S. Cl. ................................................... 423/290
[58] Field of Search ........................................ 423/290

[56] References Cited

U.S. PATENT DOCUMENTS 3,189,412  6/1965  Wood et al. .......................... 423/290

FOREIGN PATENT DOCUMENTS 23,014  10/1969  Japan ....................................... 423/290

OTHER PUBLICATIONS

Bailar, J. C. et al.; Comprehensive Inorganic Chemistry; Pergamon Press, N. Y. 1973.

*Primary Examiner*—G. O. Peters
*Attorney, Agent, or Firm*—Allison C. Collard

[57] ABSTRACT

Process for the manufacture of hexagonal boron nitride which comprises causing a starting material containing an alkali metal boride or an alkaline earth metal boride, preferably a hexa- or dodecaboride, to react with nitrogen at temperatures of at least 900° C and, if desired, up to 2500° C, in the presence of impurities or additives of other boron compounds or compounds of the alkaline earth metals or of carbon compounds. Boron nitride has many uses in various fields, among them, electronics and crucible melting for most non-metallic melts.

15 Claims, No Drawings

MANUFACTURE OF HEXAGONAL BORON NITRIDE

This is a continuation in part of U.S. patent application Ser. No. 644,399, filed Dec. 29, 1975, now abandoned.

This invention relates to a process for the manufacture of hexagonal boron nitride.

Hexagonal boron nitride, also known as "white graphite", has a number of valuable properties. It has a low density, a low dielectric constant, a good resistance to temperature changes, and a good corrosion resistance. In a hot-pressed form, it can be worked in a way similar to graphite. It is also a good conductor of heat and an excellent electrical insulator. These properties make it a very useful material for a number of purposes. It is useful in electronics, because of its outstanding dielectric properties. It is used up to a temperature of about 2500° C as a crucible material for many fused non-metallic substances which do not wet it. It is chemically very inert, and in particular is more resistant than graphite to oxidation, and it can therefore be considered as one of the most valuable refractory nitrides.

Many processes for the manufacture of hexagonal boron nitride have been described, and a review of these is given in *Gmelin's Handbuch der anorganischen Chemie*, supplement to 8th edition, vol. 13, part 1, pages 1–6 (Springer Verlag, 1974).

One commonly used industrial process mentioned by Gmelin is to cause boric acid or boron trioxide to react with ammonia at about 900° C in the presence of tertiary calcium phosphate. The calcium phosphate serves as a carrier to prevent the boron oxide, which is liquid at the reaction temperature of $\geq$ 700° C, from fusing together whereby an approximately complete reaction with $NH_3$ becomes feasible. The steam formed during the reaction according to the equation

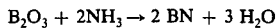

$$B_2O_3 + 2NH_3 \rightarrow 2\ BN + 3\ H_2O$$

is permitted to escape unimpeded.

In a British compilation in "Special Ceramics" by Popper, London Heywood & Company, Ltd., 1960, p. 146, the reaction is described as follows: "The reaction occurs at 800–1200° C. A solid filler is used to prevent fusion of the $B_2O_3$."

Thus, without a carrier the $B_2O_3$, which is liquid at that temperature, would form large agglomerations or lumps so that only at the surface could some minor reaction take place, but not in the interior. However, when a solid carrier is present, the liquid $B_2O_3$ is distributed in a thin sheet and provides a larger surface for $NH_3$ to react; moreover, better permeability for gas is obtained in this manner, that facilitates the removal of steam together with excess of gaseous ammonia, such removal being necessary to prevent reversal of the reaction illustrated by the above equation. This process, however, has a number of disadvantages.

First, care has to be taken regarding the purity, and especially the moisture content, of the ammonia. Because of the large volume of the reactants, the space-time yield is poor. When operating in a continuous manner, it is necessary to perform the reaction with ammonia in at least two separate heating steps in order to achieve as quantitative as possible a conversion of the $B_2O_3$ compound. The boron nitride obtained after washing out the calcium carrier with dilute mineral acid, generally has a purity of only 80 to 90%, thus necessitating a further purification step. This may be carried out either in a stream of ammonia at about 1200° C or above, or in a stream of nitrogen or argon at about 1800° C. Any boron oxide still remaining, then has to be washed out or removed in a further reaction with ammonia. Furthermore, various comminution, homogenization, filtration, granulation, and drying steps are necessary between the several reaction steps, and the chemical composition and particle size of the products has to be monitored. These steps are, of course, both time consuming and expensive. Finally, the use of gaseous ammonia necessitates special attention being paid to safety regulations and environmental pollution. In general, the processes listed in Gmelin are unsatisfactory for large scale industrial use: in many cases, the yields are poor, whereas in other cases, the products have to be purified by a number of time consuming and expensive steps, as set forth.

It is an object of the present invention to provide a process for preparing hexagonal boron nitride, which overcomes the disadvantages of the known processes and permits hexagonal boron nitride of high purity and good yield to be obtained by simple operations without the use of additional carrier materials and the inconvenience of incurring environmental pollution.

The present invention provides a process for the manufacture of hexagonal boron nitride which comprises reacting a starting material from the group consisting of an alkali metalhexaboride or-dodecaboride, or an alkali earth metal hexaboride or-dodecaboride, with a grain size having a minimum BET surface of 1 $m^2/g$, with nitrogen at a temperature of at least about 900° C and a nitriding gas pressure of at least 1 bar, in the presence of impurities or additives in the amount of at least 2% by weight, said additives consisting of boron-containing substances or carbon-containing substances.

It is particularly surprising that boron nitride can be obtained in good yields and good purity by the nitridation of an alkali metal boride or alkaline earth metal boride, since it had previously been thought that alkaline earth metal borides were inert to nitrogen even at high temperatures, calcium hexaboride being thought to be inert to nitrogen even at temperatures of up to 2000° C (cf. N. N. Greenwood, *Comprehensive Inorganic Chemistry*, Pergamon Press, 1973, vol. 1, p. 729). Literally, Greenwood states "The alkaline earth hexaborides are unaffected by nitrogen at high temperatures and $CaB_6$ is stable to at least 2000° C." Actually, Greenwood went back to an original publication by M. L. Andrieux in Rev. Met 32, pgs. 487–493 (1935) according to which the investigated $CaB_6$ had been obtained by electrolysis and had almost theoretical composition: 61.84% B; 38.16% Ca. It was, therefore, very pure and not in submicron powder form. Page 490 states "It did not react with $N_2$, even when heated to 2000° C. At that temperature, a heavy attack of the graphite vessel took place, in which it was heated." Thus, this literature did not disclose the fact that $CaB_6$ reacts with nitrogen at temperatures above 2000° C with formation of BN. Moreover, by analogy with silicon, it would have been expected that any reaction of an alkali metal boride or alkaline earth metal boride with nitrogen would produce a stable ternary metal-boron-nitrogen phase, and that there would be contamination with carbon or oxygen thus preventing the manufacture of pure boron nitride.

Surprisingly, these expected difficulties do not occur, and the present process enables boron nitride to be produced in a relatively simple manner, without the use of a carrier material, causing additional costs without the need for a large number of purification steps, and with a good yield and purity. A better space-time yield is obtained with the present process than with the previously described process, since the boron-containing reactant is less voluminous and richer in boron. The use of nitrogen has the advantage that it does not entail pollution problems as does the use of ammonia. At temperatures above 1400° C, BN is obtained, which is very stable against moisture and acids and no heating to 1800° C for stabilization is required as recommended in low temperature processes.

Of the various alkali metal borides and alkaline earth metal borides, it is preferred to use hexaborides and dodecaborides. Calcium hexaboride is a particularly suitable starting material, especially technical grade calcium hexaboride. Calcium hexaboride can be manufactured on a large industrial scale from various cheap boron ores, such as colemanite, on from lime and boric acid by means of carbothermic reduction. Consequently, technical grade calcium boride contains carbon as impurity often up to 5% by weight. Processes for the manufacture of this and other borides are described in German Auslegeschriften Nos. 1,228,236 and 1,229,505. Mixtures of borides or mixed crystals of borides can be used as starting materials.

It is characteristic for the invention that the borides used in the present process contain impurities or additives. In fact, such impurities or additives will aid in achieving an improved yield. Particularly suitable additives are carbon (up to about 20% by weight), boric acid, boron trioxide and borates of alkaline earth metals, such as colemanite (each up to 40% by weight), which show a promoting effect in lowering the nitriding temperature. Other additions, like iron and boron carbide which are impurities resulting from the boron hexaboride powder production, can be present to some extent (Fe up to about 15% by weight, $B_4C$ up to about 30% by weight) without deleterious effect for the nitridation process. Combinations of impurities and/or additives can result in the formation of additional boron nitride from boron or boride formed in situ during the nitridation by carbothermic reduction as described in detail below.

The presence of these impurities and/or additives can, of course, result in the formation of products in addition to boron nitride, but these can, in general, be removed either in the gas phase, during the reaction, or by wet chemistry, with dilute mineral acids, e.g., hydrochloric acid.

The starting material advantageously has a minimum content of impurities and/or additives of 2% by weight, and a maximum content of up to 40% by weight.

Moreover, the starting material is in the form of particles having a specific surface area, measured by the BET-method of greater than 1 $m^2/g$. Preferably, the specific surface area is greater than 5 $m^2/g$, especially greater than 10 $m^2/g$. Between the particle size of the submicron powder and the BET surface area exists the following relationship:

$$\overline{D} = 6/(Q \cdot S)$$

($\overline{D}$ = particle size in $\mu$ m
$Q$ = powder density in g/cm$^3$
$S$ = specific surface area in $m^2/g$)

Various known methods of intensive comminution and grinding may be used to obtain a starting material of the desired particle size; jet mills or attritor ball mills may, for example, be used.

In order to facilitate the circulation of the nitrogen through the boride powder, it is advantageous for the powder to be made up into porous granules. Such granules may suitably be in the form of cylindrical moldings having a diameter of from 3 to 15 mm and a length of from 10 to 50 mm. The granules should (when dry) advantageously have a green density of not more than 70% theoretical density, preferably not more than 60%. A suitable method of preparing the granules is to work the boride powder into a stiff paste, using a binder (for example, 1% Polyviol solution, trademark for polyvinyl alcohol, owned by Wacker-Chemie GmbH) or 3% boric acid solution, if necessary, processing the paste on an extruder to form cylindrical moldings, and drying these at a temperature of up to 400° C, preferably about 250° C. In some cases, for example, if the boride powder contains adhering boron oxide, the use of a binder may not be necessary.

The process is carried out at a temperature of at least 900° C. Advantageously, it is carried out in a stream of nitrogen, in which case it is preferable to use a temperature of at least 1400° C, especially of from 1600° to 2000° C. It is also preferable for the nitrogen and the boride to be flowing in counter-current to one another. The process may, alternatively, be carried out in a stationary manner, in which case the nitrogen may be used at an elevated pressure of 100 bar.

The gas used for the reaction with the boride should contain at least 90% by volume of nitrogen. Nitrogen gas of technical purity may be used in the present process, since the impurities present in conventional nitrogen gas do not interfere with the reaction. In the case of nitrogen-containing gases, the nitrogen may be admixed with, for example, carbon monoxide, air or oxygen. Industrial nitrogen-containing gas mixtures, for example, generator gas (nitrogen-carbon monoxide mixture) and cracked ammonia (nitrogen-hydrogen mixture), may be used. The rate at which the nitridation reaction proceeds increases with increasing temperature. An upper limit is imposed on the reaction temperature by the fact that boron nitride begins to dissociate at about 3000° C.

The manufacture and purification of the boron nitride can be carried out in various ways. For example, it is possible to carry out the manufacture and purification in one process stage, that is to say without a separate purification stage using wet chemistry subsequent to the nitridation. In this case, the process is generally carried out at a temperature above the boiling point of the alkali metal or alkaline earth metal of the boride. In this method, it is advantageous, especially when using an alkaline earth metal boride, either to use reactants (boride and nitrogen) that are free of oxygen or to remove any oxygen present by doping with the calculated amount of carbon or a suitable carbon-containing compound, thus forming carbon monoxide. This prevents the formation of stable metal oxides or metal borates, in the final product. In some cases, carbon or a carbon-containing compound may be added to aid in the removal of the metal via the gas phase. When using calcium boride, for example, the addition of carbon or boron carbide results in the formation of calcium cyanamide, which can be sublimated without decomposition in a nitrogen stream at a temperature of at least 1200° C.

This method of carrying out the process is advantageously performed in a discontinuous, or batchwise, production. This is because long reaction times are generally required for complete removal of by-products via the gas phase, and because volatilised by-products may condense in the cooler parts of the reactor, which, in a continuous method, could cause blockages.

If, by a suitable choice of starting material, nitrogen-containing gas, and/or reaction conditions the by-products will not, or not wholly, be removed via the gas phase, they can be removed by wet chemistry. The solid byproducts may suitably be removed by treating the product with a dilute mineral acid, for example dilute hydrochloric acid, thus dissolving the by-products and leaving the insoluble boron nitride. This method of nitridation, lends itself to a simple and economical production in a continuous manner.

One advantage of this method of operation is that it enables the reducing action of the metal formed intermediately from the metal boride to be utilized in reducing any oxygen-containing boron compounds, for example, borontrioxide, or alkaline earth metal borates, that are present in the reaction mixture. This enables additional boron nitride to be obtained from the boron in the boron-oxygen compounds. A similar effect can be achieved by the presence of carbon or boron carbide in the reaction mixture.

When using calcium hexaboride as the boride with adhering boron oxide, an optimum starting composition (assuming the calcium hexaboride to be stoichiometric and carbonfree) is 82% by weight calcium hexaboride and 18% by weight boron trioxide, in accordance with the equation $$3 CaB_6 + B_2O_3 + 10 N_2 \rightarrow 20 BN + 3 CaO.$$

If the boron trioxide content is higher than the optimum amount, it is advantageous to mix sufficient carbon with the boride to ensure that all the boron oxide is converted to boron nitride.

It is, moreover, possible to use a high proportion of boron oxide and to allow the latter reaction to proceed predominantly, alongside the nitridation of the boride. In this case, in contrast to a process solely using boron trioxide and carbon with no boride, carbon-free boron nitride is obtained in high yield.

The starting material may also comprise a combination of substances which, on heating, under an inert gas or in vacuo, will give a boride. Such a combination is, for example, calcium oxide, boron trioxide and carbon in a molar ratio of 1 : 3 : 10 respectively. In batches which are rich in boron trioxide, the boride or the boron nitride produced therefrom, acts as a carrier or diluent for the boron trioxide thus preventing it from sticking and avoiding the associated processing and engineering difficulties.

It was further found that calcium hexaboride contaminated with up to 15% by weight of iron can be used quite successfully in the present process, since the iron can readily be removed after nitridation from the boron nitride by treatment with a dilute mineral acid, e.g. hydrochloric acid.

A suitable reactor for carrying out the present process in continuous manner at a temperature of up to 2000° C consists of a vertical graphite tube heated by the direct passage of a current, through which granules of the boride starting material may be passed downward under their own weight while nitrogen may be passed upward. Such tubes are known by the name Tammann-furnace. If the nitridation is incomplete after one passage of the material through such a furnace, for example because of too short a residence time in the zone of maximum temperature, or by using granules with a green density of more than 70%, nitridation may be completed by a second passage through the furnace, or by passage through a second furnace. In this case, it is advantageous for the product from the first passage to be homogenized by a short grinding step and again formed into granules, prior to the second passage. The composition of the mixture may also be altered at this intermediate stage, if desired.

If it is desired to use temperatures exceeding 2000° C in order to achieve higher reaction rates, the process may, for example, be carried out in a plasma jet furnace.

The following examples illustrate the process of the invention. Percentages are by weight unless stated otherwise.

EXAMPLE 1

10 g of lithium dodecaboride powder, having an analytical composition of 87.85% B (total), 5.20% Li, 0.90% C and 4.59% $B_2O_3$, and a specific (BET) surface area of 7.6 $m^2/g$, was mixed with a little water to form a paste and then pressed in an extruder to give cylindrical moldings of a diameter of about 8 mm and a length of 15 to 30 mm. The moist moldings were dried in a circulating-air oven at 250° C. The dried granules were then introduced into the heating zone (zone of maximum constant temperature) of a carbon tube-short circuit Tammann furnace, the inside of the heating tube of which had been lined with a thin protective layer of boron nitride, in order to prevent as far as possible a reaction of the granules with the carbon of the heating tube. After sufficient flushing (300 liters/h) of the installation with technical grade nitrogen (main impurity about 0.1% of oxygen) from a cylinder, the furnace was heated up under a stationary nitrogen atmosphere, to 2000° ± 100° C, and this temperature was maintained constant for 60 minutes. The furnace was then switched off and cooled to room temperature under a nitrogen atmosphere. After comminution of the production in a fixed-hammer mill, 19 g of boron nitride powder having a nitrogen content of 55.65% were obtained. An X-ray diffractometer diagram of the material obtained showed only lines of the hexagonal modification of boron nitride. The yield of BN was 94%.

EXAMPLE 2

The procedure followed was as in Example 1, but with the difference that magnesium dodecaboride powder, having an analytical composition of 80.01% B (total), 14.24% Mg, 0.40% C and 1.71% $B_2O_3$, and a specific surface area of 14.0 $m^2/g$, was employed as the starting material and a stream of nitrogen was used. 17 g of BN, which according to X-ray examination was a single phase and contained 54.30% of nitrogen, were obtained. Yield of BN 93%.

EXAMPLE 3

74 g of a pulverulent mixture, consisting of 96% of $CaB_6$, having an analytical composition of 58.31% B (total), 35.47% Ca, 4.17% C and 3.03% $B_2O_3$, and a specific (BET) surface area of 15.1 $m^2/g$, and 4% of carbon in the form of carbon black, were formed into granules using a 1% solution of Polyviol. After nitriding the granules in a stream of nitrogen at 1800° ± 50° C for 3 hours, 85 g of boron nitride with a nitrogen content of 55.15% were obtained. Yield of BN:92%.

Examples 1 to 3 illustrate the direct preparation of boron nitride without following wet treatment for the removal of byproducts of the reaction in accordance with one mode of operation outlined in the specification above. The process is carried out discontinuously in a current of nitrogen at atmospheric pressure. As starting materials, borides are used with a total of at least 2% by weight of impurities and/or additives:

Example 1: Lithium dodecaboride with 0.9% C + 4.59% $B_2O_3$;
Example 2: Magnesium dodecaboride with 0.4% C and 1.71% $B_2O_3$;
Example 3: Calcium hexaboride with 4.17% C and 3.3% $B_2O_3$ + 4% carbon black added.

The reaction temperature of 2000° C and 1800° C, respectively, lies above the boiling points of the alkali metals or alkaline earth metals which are used in form of their borides (Li: B.p. 1609° ± 5° C, Mg B.p. 1100°–1120° C, Ca: B.p. 1240° C). The reaction takes place as follows, demonstrated by $CaB_6$

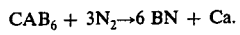
$CAB_6 + 3N_2 \rightarrow 6 BN + Ca.$

The alkali metal or alkaline earth metal formed as byproduct of the reaction is removed via the gas phase. For promoting the removal by the gas phase, in example 3 C carbon black is added which reacts with Ca by formation of

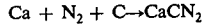
$Ca + N_2 + C \rightarrow CaCN_2$ which is removed by sublimation under the existing conditions. Oxygen impurities are removed as CO.

In the following examples 4 to 15 the preparation of boron nitride is illustrated with subsequent wet treatment for removal of the byproducts of the reaction as described in other operational methods in the specification.

EXAMPLE 4a 57 g of calcium boride powder, having an analytical composition of 62.14% B (total), 36.15% Ca, 0.75% C and 1.29% $B_2O_3$, and a specific (BET) surface area of 13.8 m²/g, were granulated using a 1% solution of Polyviol. After nitriding the dried granules in a stream of nitrogen at 1800° ± 50° C for one hour, 86 g of a light grey reaction product were obtained, having an analytical composition of 46.45% N, 37.17% B (total), 8.84% Ca, 0.18% C and 1.28% $B_2O_3$. An X-ray examination showed the presence of BN as well as small amounts of calcium hydroxide. After treating the powdered nitridation product with dilute hydrochloric acid, 75 g of white BN, having an analytical composition of 55.51% N, 44.31% B < 0.1% Ca and 0.1% C, were obtained. Yield of BN: 93%.

EXAMPLE 4b

The same material was used as in Example 4a, with no additives admixed, but the reaction was carried out at 1600° C. After 60 minutes, the yield in BN was only 82% and this product contains still 2% of unreacted $CaB_6$, which cannot be removed with diluted chloric acid.

In Examples 4a and 4b, the $CaB_6$ used does not contain a total of impurities of more than about 2% by weight. This is a so-called "pure" laboratory product which cannot be prepared in powder form in such purity in powder form by a large-scale technical process. The same starting product was used in Examples 5-8 to show the effect of additives, such as C in the form of carbon black, $H_3BO_3$, and colemanite. The reaction temperature thus can be lowered to 1600° C, with yields obtained from 88 to 90%, the end product being free of unreacted $CaB_6$.

EXAMPLE 5

50 g of a pulverulent mixture, consisting of 85% of $CaB_6$ of the same composition as in Example 4a and 15% of carbon in the form of carbon black, were formed into granules using 1% solution of Polyviol. The dried granules were then heated at 1600° ± 50° C in an atmosphere of flowing nitrogen for 60 minutes. Obtained were 80 g of a light grey product, having an analytical composition of 45.50%, N, 30.73% B (total), 15.85% Ca, 2.73% C and 1.95% $B_2O_3$. After treating the nitridation product with dilute hydrochloric acid, 54 g of BN, having an analytical composition of 54.40% N, 43.44% B, 0.37% Ca and 0.50% C, were obtained. Yield of BN: 88%.

EXAMPLE 6

The procedure followed was as in Example 5, with the difference that 50 g of a pulverulent mixture, of 65% of $CaB_6$ of the composition as in Example 4a and 35% of $H_3BO_3$ were employed. 63 g of a white nitridation product, having an analytical composition of 40.20% N, 33.75% B (total), 14.0% Ca, 2.58% $B_2O_3$ and 0.1% C, were obtained. 47 g of BN, having an analytical composition of 55.70% N, 43.87% B <0.1% Ca and <0.1% C, resulted from treatment with dilute hydrochloric acid. Yield of BN: 90%.

EXAMPLE 7

The procedure followed was as in Example 5, with the difference that 63 g of a pulverulent mixture of 65% of $CaB_6$ and 35% of colemanite were employed. After treatment with dilute hydrochloric acid, 58 g of BN, having an analytical composition of 55.65% N, 43.77% B, <0.1% Ca and <0.1% C were obtained. Yield of BN: 88%.

EXAMPLE 8

The procedure followed was as in Example 5, with the difference that 50 g of a pulverulent mixture of 75% of $CaB_6$ and 25% of $B_4C$ (grade 1500) were employed. The nitridation was carried out at 1800° ± 50° C. After treatment with a dilute hydrochloric acid, 68 g of BN, having an analytical composition of 55.95% N, 44.39% B, <0.1% Ca and <0.1% C, were obtained. Yield of BN: 87%.

This example shows that the addition of $B_4C$ does not make a decrease in the reaction temperature possible. However, the mixture of "pure" $CaB_6$ and $B_4C$ reacts at 1800° C in analogy with the technically pure $CaB_6$ (containing about 5.5 to 11% b.w. of impurities in the form of C+$B_2O_3$) without BN contaminated by C, resulting. Contrary thereto, $B_4C$ alone (in absence of $CaB_6$) leads to BN heavily contaminated by C when reacted with $N_2$.

EXAMPLE 9

The procedure followed was as in Example 4a, with the difference that 60 g of a technically pure calcium boride powder, having an analytical composition of 58.31% B (total), 35.47% Ca, 4.17% C and 3.03% $B_2O_3$, and a specific (BET) surface area of 15.1 $m^2/g$, were employed. 85 g of a white nitridation product with 44.85% N and, after treatment with dilute hydrochloric acid, 71 g of BN with 55.90% N, were obtained. Yield of BN: 88%. While with this technically pure $CaB_6$, a complete reaction is obtained at 1800° C in 60 minutes, at 1600° C a reaction product is obtained in which 2% unreacted $CaB_6$ is present.

EXAMPLE 10

The procedure followed was as in Example 4 with the difference that 80 g of a calcium boride powder, contaminated with iron and having a analytical composition of 47.27% B (total), 28.38% Ca, 3.57% C, 5.82% $B_2O_3$ and 13.40% Fe and a specific (BET) surface area of 7.0 $m^2/g$, were employed. After treating the nitridation product with dilute hydrochloric acid, 81 g of BN, having an analytical composition of 55.41% N, 44.10% B, <0.1% Ca, <0.1% C and <0.01% Fe, were obtained. Yield of BN: 94%. When $CaB_6$ is pulverized intensively in a steel mill, even the 15% Fe then present do not interfere with the BN production.

EXAMPLE 11

50 g of a mixture, consisting of 50% of $CaB_6$ powder, having an analytical composition of 58.24% B (total), 34.68% Ca, 4.13% C and 4.00% $B_2O_3$ and a specific (BET) surface area of 7.0 $m^2/g$, 40% of $H_3BO_3$ powder and 10% of C in the form of carbon black, were formed into granules using a 1% solution of Polyviol. After drying the granules at 300° C, and nitriding them at 1700° ± 50° C in a nitrogen stream for two hours, and treatment of the nitridation product with dilute hydrochloric acid, 36 g of BN with a nitrogen content of 55.35% were obtained. Yield of BN: 87%. This example shows that by the addition of $H_3BO_3+C$ to technically pure $CaB_6$, the temperature of 1700° C will lead to complete reaction.

EXAMPLE 12

70 g of calcium hexaboride, having an analytical composition of 55.97% B (total), 33.22% Ca, 3.86% C and 7.15% $B_2O_3$ and a specific (BET) surface area of 21.2 $m^2/g$, were formed into granules without using an additional binder. The granules I obtained were dried and then heated at 1600° ± 50° C in a stream of nitrogen for 30 minutes. This gave 108 g of a light grey nitridation product I, which was pulverized in a fixed-hammer mill. The resulting fine powder was formed into granules using a 3% solution of boric acid, to give, after drying, 105 g of granules II. These were heated in a second nitriding stage, at 1600° ± 50° C in a stream of nitrogen for 30 minutes, analogously to the first nitriding step. This gave 105 g of nitridation product II and, after treatment with dilute hydrochloric acid, 77 of pure BN. Yield of BN: 86%. This show that the use of especially fine powders (BET) surface >20 $m^2/g$, a complete reaction is possible even at 1600° C.

EXAMPLE 13

10 g of calcium boride powder, which passed through a sieve with an open mesh width of 0.041 mm (−325 mesh) and had an analytical composition of 59.90% B (total), 27.50% Ca, 6.0% C and 2.75% $B_2O_3$, and a specific (BET) surface area of 2.7 $m^2/g$, were nitrided in loose form, that is to say, without granulation, at 1400° C under a nitrogen pressure of 100 bar for 30 minutes. After treating the nitridation product with dilute hydrochloric acid, 12 g of pure BN were obtained. Yield of BN: 87%.

In this Example, it was shown that a complete yield was obtainable with the use of technically pure $CaB_6$ even at a reaction temperature of 1400° C in 30 minutes, when a pressure — in this case of 100 bar — is employed; and this is independent of the fineness of the powder, because a comparatively coarse-grain powder was used, spc. BET surface of 2.8 $m^2/g$. For comparison, it may be added that with the same technically pure $CaB_6$ at 1800° C, but under normal pressure (1bar), a reaction product was obtained that only contained about 5% BN.

EXAMPLE 14

The procedure followed was as in Example 13, with the difference that 15 g of calcium boride powder, having an analytical composition of 55.97% B (total), 33.22% Ca, 3.86% C and 7.15% $B_2O_3$ and a specific (BET) surface area of 21.2 $m^2/g$, were employed. 17 g of BN were obtained. Yield of BN: 88%.

EXAMPLE 15

The procedure followed was as in Example 13, with the difference that 10 g of lithium dodecaboride powder, having an analytical composition of 87.85% B (total), 5.20% Li, 0.90% C and 4.59% $B_2O_3$ and a specific (BET) surface area of 7.6 $m^2/g$, were employed. This gave 18 g of hexagonal BN. Yield of BN: 89%.

Examples 14 and 15 show that in case of pressure application, the grain size of the powder is not a decisive factor. The same results are obtained at 1400° C with specific (BET) surface are as >20$m^2/g$ and > 5$m^2/g$.

From the foregoing description, one skilled in the art can easily ascertain the essential characteristics of this invention, and, without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for the manufacture of hexagonal boron nitride which comprises, reacting a starting material selected from the group consisting of an alkali metal hexaboride, an alkali metal dodecaboride, an alkaline earth metal hexaboride and an alkaline earth metal dodecaboride with a grain size having a minimum BET surface of 1 $m^2/g$, with nitrogen at a temperature of at least about 900° C and a nitriding gas pressure of at least 1 bar, in the presence of at least one additive in the amount of at least 2% by weight, selected from the group consisting of $B_2O_3$, boric acid, boron carbide, an alkaline earth metal borate, carbon and iron.

2. The process according to claim 1, wherein the starting boride is calcium hexaboride.

3. The process according to claim 1, wherein the starting boride is calcium hexaboride and the additive is selected from the group consisting of boron trioxide, boric acid, a calcium borate and carbon black.

4. The process according to claim 1, wherein the additive is selected from the group consisting of boron trioxide, boric acid, and an alkaline earth metal borate in an amount not larger than 40% by weight.

5. The process according to claim 1, wherein the carbon-containing additive is present in an amount not larger than 20% by weight.

6. The process according to claim 1, wherein the nitridation is carried out above about 900° C under a nitrogen pressure of 100 bar.

7. The process according to claim 1, wherein the reaction is carried out at a temperature of at least about 1400° C in a nitrogen current.

8. The process according to claim 7, wherein the reaction is carried out at a temperature of from 1600° to 2000° C.

9. The process according to claim 1, wherein a gas mixture comprising nitrogen is used as the source of the nitrogen, the amount of nitrogen being at least 90% by volume.

10. The process according to claim 1, wherein technical grade nitrogen is used as the source of the nitrogen.

11. The process according to claim 1, wherein the starting material has a specific surface area of at least 5 m$^2$/g.

12. The process according to claim 11, wherein the starting material has a specific surface area of at least 10 m$^2$/g.

13. The process according to claim 7, wherein the starting material of submicron powder is made into porous granules before nitridation.

14. The process according to claim 1, wherein reaction products other than the boron nitride are removed during the heating operation via the gas phase.

15. The process according to claim 14, wherein only a part of the reaction products other than the boron nitride are removed from the boron nitride via the gas phase and the remainder by dissolution in a dilute mineral acid.

* * * * *

UNITED STATES PATENT OFFICE
CERTIFICATE OF CORRECTION

Patent No. 4,107,276   Dated Aug. 15, 1978

Inventor(s) Schwetz et al.

It is certified that error appears in the above-identified patent and that said Letters Patent are hereby corrected as shown below:

Column 6, line 45, delete "production" and substitute therefor --product-- . Column 8, line 56, delete "a". Column 10, line 2, delete "6.0%" and substitute therefor --6.03%--.

Signed and Sealed this

Twenty-seventh Day of February 1979

[SEAL]

Attest:

RUTH C. MASON
Attesting Officer

DONALD W. BANNER
Commissioner of Patents and Trademarks